(12) United States Patent
Diestelhorst et al.

(10) Patent No.: US 10,394,557 B2
(45) Date of Patent: Aug. 27, 2019

(54) DEBUGGING DATA PROCESSING TRANSACTIONS

(71) Applicant: ARM LIMITED, Cambridge (GB)

(72) Inventors: Stephan Diestelhorst, Cambridge (GB); Michael John Williams, Ely (GB); Richard Roy Grisenthwaite, Cambridge (GB); Matthew James Horsnell, Cambridge (GB)

(73) Assignee: ARM Limited, Cambridge (GB)

( * ) Notice: Subject to any disclaimer, the term of this patent is extended or adjusted under 35 U.S.C. 154(b) by 238 days.

(21) Appl. No.: 15/538,365

(22) PCT Filed: Nov. 23, 2015

(86) PCT No.: PCT/GB2015/053559
§ 371 (c)(1),
(2) Date: Jun. 21, 2017

(87) PCT Pub. No.: WO2016/102919
PCT Pub. Date: Jun. 30, 2016

(65) Prior Publication Data
US 2017/0351517 A1   Dec. 7, 2017

(30) Foreign Application Priority Data

Dec. 23, 2014 (GB) .................................. 1423041.1
Dec. 23, 2014 (GB) .................................. 1423042.9
Jan. 7, 2015 (GB) .................................. 1500183.7

(51) Int. Cl.
*G06F 9/30* (2018.01)
*G06F 11/36* (2006.01)
(Continued)

(52) U.S. Cl.
CPC ........ *G06F 9/30043* (2013.01); *G06F 9/3004* (2013.01); *G06F 9/3834* (2013.01);
(Continued)

(58) Field of Classification Search
CPC .................................................. G06F 9/30043
See application file for complete search history.

(56) References Cited

U.S. PATENT DOCUMENTS

| | | | |
|---|---|---|---|
| 2002/0188833 A1* | 12/2002 | Henry ................... | G06F 9/3806 712/236 |
| 2002/0194464 A1* | 12/2002 | Henry ................... | G06F 9/3848 712/239 |

(Continued)

OTHER PUBLICATIONS

International Search Report and Written Opinion of the ISA for PCT/GB2015/053559, dated Apr. 29, 2016, 18 pages.

(Continued)

*Primary Examiner* — William B Partridge
(74) *Attorney, Agent, or Firm* — Nixon & Vanderhye P.C.

(57) ABSTRACT

A data processing system supporting execution of transactions comprising one or more program instructions that execute to generate speculative updates is provided. The speculative updates are committed in normal operation if the transaction completes without a conflict. Start of execution of a transaction may be detected and execution diverted to be performed by software emulation rather than direct execution by the processing hardware. The software emulation may store data representing one or more versions of the speculative updates generated during the emulation. The software emulation may also detect conflicts with the transaction being emulated. In order to facilitate modifying the behaviour of other parts of the system interacting with a transaction under investigation, a non-standard response signal may be returned in response to a detected memory access request to a transaction being emulated. The non-standard response signal may be used to initiate the request source to follow a subsequent path of processing different from that which it would otherwise follow. Support is also provided for detecting a trigger condition which results in (Continued)

the halting (freezing) of a partially completed transaction and the saving the speculative updates associated with that partially completed transaction to the architectural state of the system.

15 Claims, 8 Drawing Sheets

(51) Int. Cl.
| | | |
|---|---|---|
| *G06F 9/38* | (2018.01) | |
| *G06F 9/455* | (2018.01) | |
| *G06F 9/46* | (2006.01) | |
| *G06F 12/08* | (2016.01) | |
| *G06F 12/126* | (2016.01) | |

(52) U.S. Cl.
CPC ............ *G06F 9/3842* (2013.01); *G06F 9/455* (2013.01); *G06F 9/46* (2013.01); *G06F 9/467* (2013.01); *G06F 11/362* (2013.01); *G06F 11/3636* (2013.01); *G06F 12/08* (2013.01); *G06F 12/126* (2013.01)

(56) References Cited

U.S. PATENT DOCUMENTS

| | | |
|---|---|---|
| 2004/0162948 A1 | 8/2004 | Tremblay et al. |
| 2004/0162951 A1 | 8/2004 | Jacobson et al. |
| 2007/0239942 A1 | 10/2007 | Rajwar et al. |
| 2009/0007107 A1 | 1/2009 | Taillefer et al. |
| 2009/0113443 A1 | 4/2009 | Heller, Jr. et al. |
| 2010/0070727 A1 | 3/2010 | Harris et al. |
| 2012/0179877 A1 | 7/2012 | Shriraman et al. |
| 2015/0095627 A1* | 4/2015 | Dechene ............ G06F 9/30145 712/228 |
| 2015/0242277 A1 | 8/2015 | Cain, III et al. |
| 2016/0239403 A1* | 8/2016 | Williams ............ G06F 11/3644 |

OTHER PUBLICATIONS

Search Report for GB1423041.1, dated Jun. 19, 2015, 4 pages.
Search Report for GB1500183.7, dated Jul. 2, 2015, 4 pages.
Search Report for GB1500183.7, dated Sep. 24, 2015, 2 pages.
Rajwar et al., "Virtualizing Transactional Memory", IEEE Proceedings of the 32nd International Symposium on Computer Architecture. Jun. 2005. IEEE, pp. 494-505.

* cited by examiner

DEBUGGING DATA PROCESSING TRANSACTIONS

This application is the U.S. national phase of International Application No. PCT/GB2015/053559 filed 23 Nov. 2015, which designated the U.S. and claims priority to GB Patent Application No. 1423041.1 filed 23 Dec. 2014, GB Patent Application No. 1423042.9 filed 23 Dec. 2014, and GB Patent Application No. 1500183.7 filed 7 Jan. 2015, the entire contents of each of which are hereby incorporated by reference.

This disclosure relates to data processing systems.

There may be provided data processing systems supporting transactions in which a plurality of program instructions execute to generate speculative updates to state data and to commit the speculative updates if the transaction completes without a conflict. Such transactions may be used, for example, to facilitate multi-threaded processing using a shared memory in which transactions using data values within the shared memory may be allowed to proceed in parallel relying upon the ability to avoid committing speculative updates should a conflict arise between memory accesses. In most cases, such conflicts do not arise and accordingly the parallel processing proceeds efficiently without the need to support the overhead of more rigid mechanisms, such as the use of memory locks, and yet when a conflict does arise it is possible to recover as the speculative updates to state data will not have been committed.

In at least some example embodiments of the disclosure there is provided a method of processing data comprising:

executing program instructions including a target transaction having one or more program instructions that execute to generate speculative updates to state data and to commit said speculative updates if said target transaction completes without a conflict;

detecting a trigger condition corresponding to direct execution by processing hardware of a program instruction of said target transaction;

upon detecting said trigger condition, initiating software emulation of execution of said target transaction, said software emulation operating:

to store data representing one or more versions of said speculative updates generated during emulation of execution of said target transactions; and to detect a conflict with said target transaction.

In at least some example embodiments of the disclosure there is provided apparatus for processing data comprising processing hardware directly to execute program instructions including a target transaction comprising one or more program instructions that execute to generate speculative updates to state data and to commit said speculative updates if said transaction completes without a conflict;

detection circuitry to detect a trigger condition corresponding to direct execution by said processing hardware of a program instruction of said target transaction;

emulation circuitry to perform, upon detecting said trigger condition, software emulation of execution of said target transaction, said software emulation operating:

to store data representing one or more versions of said speculative updates generated during emulation of execution of said target transactions; and to detect a conflict with said target transaction.

In at least some example embodiments of the disclosure there is provided a method of processing data comprising:

issuing a memory access request from a request source;

detecting receipt of a non-standard response signal at said request source;

in dependence upon detection of receipt of said non-standard response signal initiating either a first path of subsequent processing that updates architectural state data of said request source or a second path of subsequent processing that updates architectural state data of said request source, said first path being different from said second path.

In at least some example embodiments of the disclosure there is provided apparatus for processing data comprising:

issue circuitry to issue a memory access request from a request source;

detection circuitry to detect receipt of a non-standard response signal at said request source;

processing path control circuitry operating in dependence upon detection of receipt of said non-standard response signal to initiate either a first path of subsequent processing that updates architectural state data of said request source or a second path of subsequent processing that updates architectural state data of said request source, said first path being different from said second path.

In at least some example embodiments of the disclosure there is provided a method of processing data comprising:

executing program instructions including a transaction having one or more program instructions that execute to generate speculative updates to state data and to commit said speculative updates if said transaction completes without a conflict;

detecting a trigger condition;

upon detecting said trigger condition, stopping execution of said transaction prior to completion of said transaction and committing at least some of said speculative updates to state data.

In at least some example embodiments of the disclosure there is provided apparatus for processing data comprising:

processing circuitry to execute program instructions including a transaction having one or more program instructions that execute to generate speculative updates to state data and to commit said speculative updates if said transaction completes without a conflict;

detection circuitry to detect a trigger condition;

control circuitry operating upon detecting said trigger condition to stop execution of said transaction prior to completion of said transaction and to commit at least some of said speculative updates to state data.

Example embodiments will now be described, by way of example only, with reference to the accompanying drawings.

When executing program instructions as part of a transaction which generates speculative updates that are discarded if the transaction is not completed without a conflict, there are difficulties in obtaining diagnostic data (debug data) which can be used to understand faults arising in such transactions. In particular, conventional diagnostic/debug mechanisms such as breakpoints and watchpoints which halt the execution occurring at particular points in the processing typically have the side effect of the loss of the speculative updates associated with a partially completed transaction as these will typically be flushed as a consequence of invoking the diagnostic/debug mechanisms. In some embodiments of the disclosure, this may be addressed by detecting a trigger condition corresponding to direct execution by processing hardware of a target transaction and using this to initiate software emulation of that target transaction in place of the direct execution. The software emulation can operate to store/preserve one or more versions of the speculative updates generated during the emulation such that these may be available for use in debugging/diagnostic operations. The software emulation can continue to detect any conflict with the transaction being emulated in order that it interacts with the remaining system in a manner substantially corresponding to direct execution by the processing hardware.

Some transactions may comprise one program instruction that executes to generate speculative updates to state data. For example, on some occasions there may only be one transaction between a transaction start and a transaction end. Also, in some cases a single executed instruction may trigger a number of speculative updates to state data which may be committed if they all complete without a conflict. Hence, in some cases the transaction may comprise a single instruction which triggers speculative updates.

However, often a transaction may comprise a plurality of program instructions which each generate speculative updates to state, with the speculative updates being committed if the transaction completes without a conflict.

Whilst conflict between transactions can take a number of forms (e.g. competing for a shared resource), one common source of conflict is an access to a memory address that is used by the target transaction being emulated. The software emulation can trap such an access and indicate it as a conflict. The access may be any access (e.g. read or write) to the same address or one within the same region tracked as in use.

A useful feature that can be supported in some example embodiments is that the software emulation provides for the single-stepping of execution of the target transaction such that the software emulation can be stopped after emulation of execution of individual instructions of the target transactions. This may permit a fine grained understanding of the behaviour of the target transaction to be obtained.

While it is possible that the emulation may be restricted to a single transaction, the present disclosure also provides that a plurality of target transactions may be concurrently subject to software emulation. The software emulation may serve to detect conflicts arising between such a plurality of concurrently executing target transactions supported by software emulation.

In some example embodiments the start of a target transaction may be marked by a transaction start instruction. In such circumstances, the trigger condition which triggers the start of software emulation may be the execution of such a transaction start instruction for a target transaction.

When a given target transaction is being subject to software emulation, it may be desired to identify sources of requests for memory accesses which conflict with the target transaction being subject to software emulation. Such behaviour may be facilitated by issuing a non-standard response to a request source issuing such a conflicting memory access request. This non-standard response may then serve to trigger non-standard behaviour in the request source to facilitate an understanding of its behaviour. Such non-standard responses may include, for example, stalling execution of the request source, retrying the request, or initiating software emulation of execution at the request source.

The understanding of the interaction of potentially conflicting different portions of a system may be facilitated in some example embodiments of the disclosure in which a relative rate of software emulation of execution for a request source which conflicts and the software emulation of the target transaction may be controlled.

In some example embodiments of the disclosure the software emulation may also serve to model the availability of resources for storing the speculative updates to state data. The availability of such resources may be an issue which gives rise to incorrect operation and accordingly it is useful that such behaviour be emulated.

Data processing systems which support transactions typically include detecting hardware circuitry which serves to detect conflicts arising during direct hardware based execution of transactions. Such detecting hardware circuitry may, for example, include memory snoop hardware for supporting data coherence. Within such systems, the software emulation of a transaction may reuse the conflict detecting hardware circuitry to detect conflict arising during emulation of execution of the target transaction. The software emulation may program the conflict detecting hardware circuitry with appropriate data/parameters such that it serves to detect conflicts with transaction being subject to the software emulation.

Some example embodiments of the present disclosure support different forms of behaviour depending upon whether or not a non-standard response signal is received in response to a memory access request. Within such embodiments either a first path of subsequent processing that proceeds to update architectural state data or a second path of subsequent processing that proceeds differently to update architecturally state data is followed in dependence upon whether or not the non-standard response signal has been received. These different paths are both legitimate paths for further processing and forward progress.

In some example embodiments, the non-standard response signal may be returned when a conflicting memory access at a request destination is detected when that request destination is performing software emulation of a transaction. In this way, request sources which interact with a software emulated transaction may be triggered to follow a different path of processing than would otherwise be the case through the return of the non-standard response signal. For example, the non-standard response signal may trigger the request source itself to start software emulation of its processing.

While it will be appreciated that the normal assumption for transaction based processing is that speculative updates are not committed if a conflict arises, in some example embodiments of the disclosure, this model may be broken such that upon detection of a triggered condition the execution of the transaction is stopped and the speculative updates to state data are committed even though the transaction has not completed normally. Such behaviour deviates from the architectural assumption associated with transactions and so ongoing processing may no longer be possible, but in some circumstances the visibility achieved of the speculative updates of state data may permit a useful understanding of the behaviour of the system to be achieved in a manner that would otherwise be difficult.

As well as freezing the execution of the transaction for which the trigger condition was detected, in some embodiments of the disclosure the execution of one or more concurrently executing program threads which interact with that transaction may also be stopped. This may be facilitated by the use of the non-standard response signals as previously discussed to trigger the halting of execution of any concurrently executing program threads which request access to any of the data within a working set of data used by the transaction which has itself been halted. These further threads may themselves be further transactions which then save their speculative updates even though they have not completed.

It will be appreciated that the trigger condition associated with the stopping of a partially completed transaction and the saving of its speculative updates can take a variety of different forms. These forms may include, for example, detecting execution of a triggered program instruction, detecting execution of a program instruction having an associated program counter value matching a predetermined triggered program counter; and/or detecting access to a predetermined memory address or range of addresses.

Figure 1:
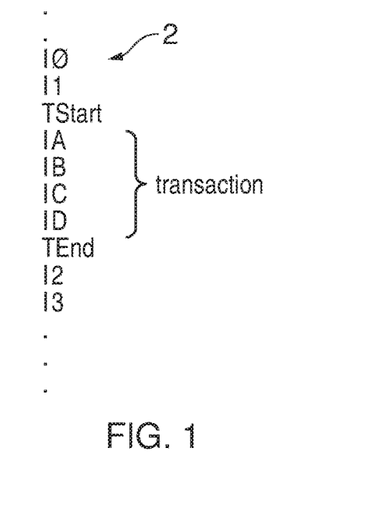
FIG. 1 schematically illustrates a stream of program instructions including a transaction.

FIG. 1 schematically illustrates a stream of program instructions 2 which may be executed by processing circuitry. It will be appreciated that this stream of program instructions may be one thread executing within a multi-threaded system. Alternatively, the stream of program instructions may be the single thread of program instructions executing. Within the stream of program instructions illustrated in FIG. 1, there are included a transaction start instruction TStart and a transaction end instruction TEnd. These instructions respectively indicate the boundaries of a transaction comprising instructions IA, IB, IC and ID. These transactions bounded by the TStart and the Tend are executed by the processing circuitry to generate speculative updates to state data. These speculative updates are stored within memory, or other storage resources of the system (e.g. shadow registers, special purpose memory permitting roll back, and the like), until it is determined that the transaction has completed without a conflict at which point the speculative updates are committed to the system (e.g. update the architectural state (e.g. the state forming the programmers model of the system) of the system with the stored roll back data then being discarded freeing up the associated memory resource to support a further transaction).

Figure 2:
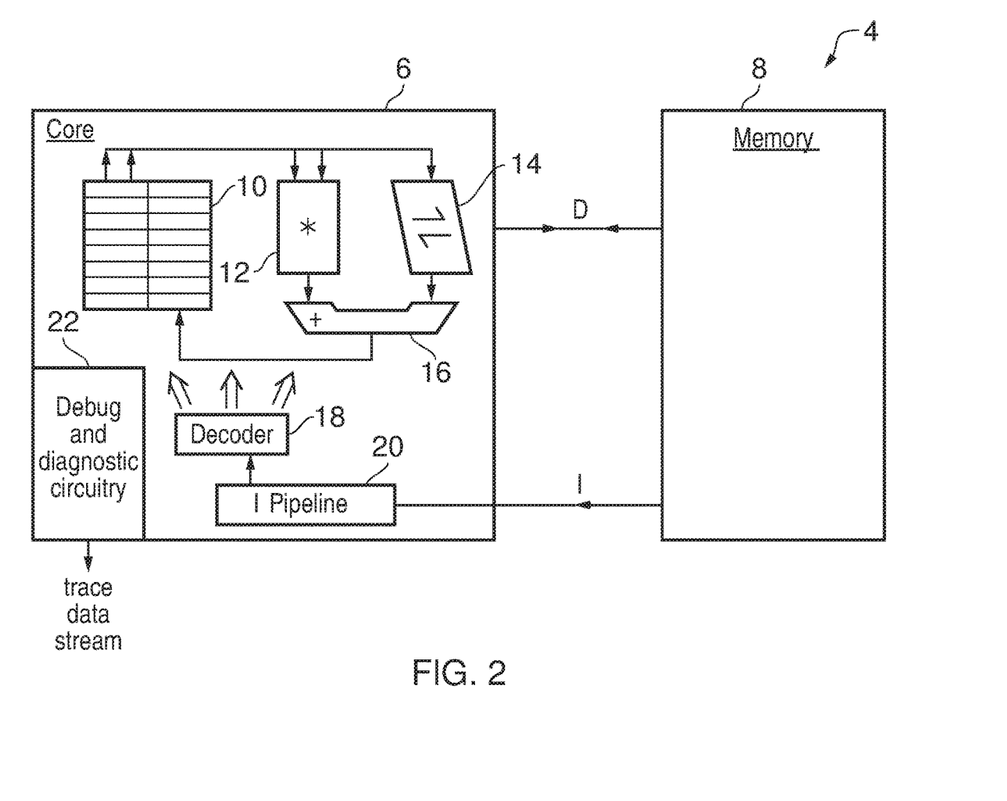
FIG. 2 schematically illustrates a data processing system for executing program instructions.

FIG. 2 schematically illustrates a data processing system 4 including a processor core 6 and a memory system 8. The memory system 8 may be a hierarchical system including one or more levels of cache memory as well as a main memory. The hierarchical memory system 8 may be shared with other processors, or with other threads running on the same processor. The processor core 6 provides processing circuitry for executing program instructions fetched from the memory 8. The results of the execution of the program instructions may be written back to the memory 8. Load and store program instructions may be used to read and write data from and to the memory 8. The processor core 6 includes a register bank 10, a multiplier 12, a shifter 14 and an adder 16 which together perform processing operations to execute the program instructions until control of control signals generated by an instruction decoder 18 as program instructions reach the decode stage within an instruction pipeline 20. Also associated with the processor core 6 is debug and diagnostic circuitry 22 which serves to perform, for example, instruction sampling to capture instruction diagnostic data and tracking of transactions which include sampled instructions so as to generate transaction diagnostic data. This instruction diagnostic data and transaction diagnostic data may be written out to the memory 8 or may be output in a trace data stream depending upon the embodiment and/or the requirements for operating an embodiment supporting both potential output mechanisms. The debug and diagnostic circuitry 22 may also detect a trigger condition to start software emulation of a transaction.

Figure 3:
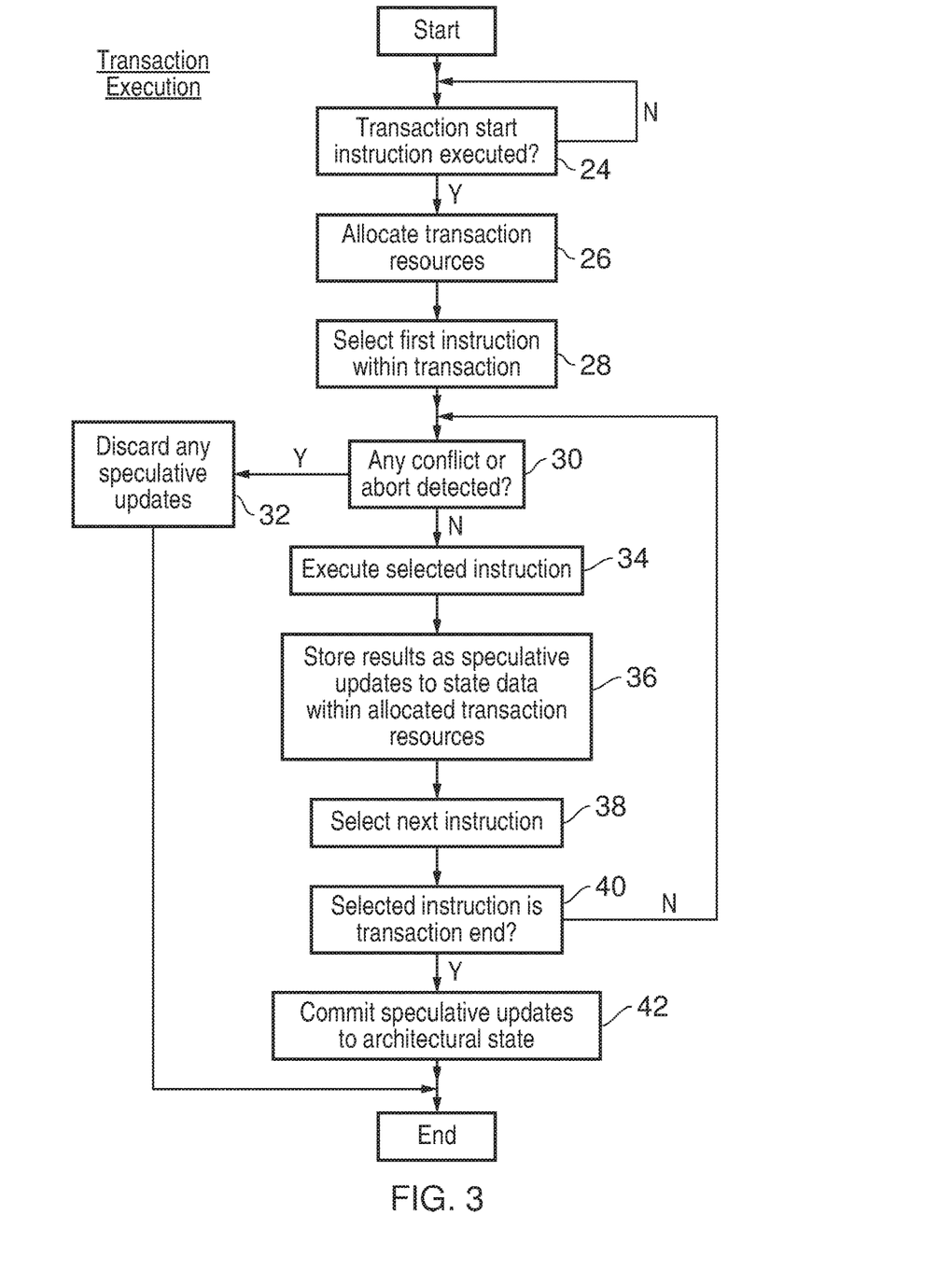
FIG. 3 is a flow diagram schematically illustrating transaction execution.

FIG. 3 is a flow diagram schematically illustrating the execution of a transaction comprising multiple program instructions. At step 24 processing waits until a transaction start instruction is executed. Step 26 allocates transaction resources used, for example, to store the speculative updates to state data prior to the transaction completing without conflict and the speculative updates being committed. Step 28 selects the first instruction within the transaction. Step 30 determines whether or not there are any conflicts or aborts detected at that time. If there are any such conflicts or aborts detected, then step 32 serves to discard any speculative updates and return the transaction resources allocated at step 26 for use in other transactions.

If there are no conflicts or aborts detected at step 30, then step 34 serves to execute the selected instruction. Step 36 stores the results of the execution at step 34 as speculative updates to state data within the allocated transaction resources. Step 38 selects a next instruction. Step 40 determines whether or not the selected instruction is a transaction end instruction. If the instruction is not a transaction end instruction, then processing returns to step 30. If the determination at step 40 is that the selected instruction is a transaction end instruction, then step 42 serves to commit the speculative updates stored within the allocated transaction resources so as to update the architectural state of the system since the transaction has executed without a conflict or an abort arising.

Figure 4:
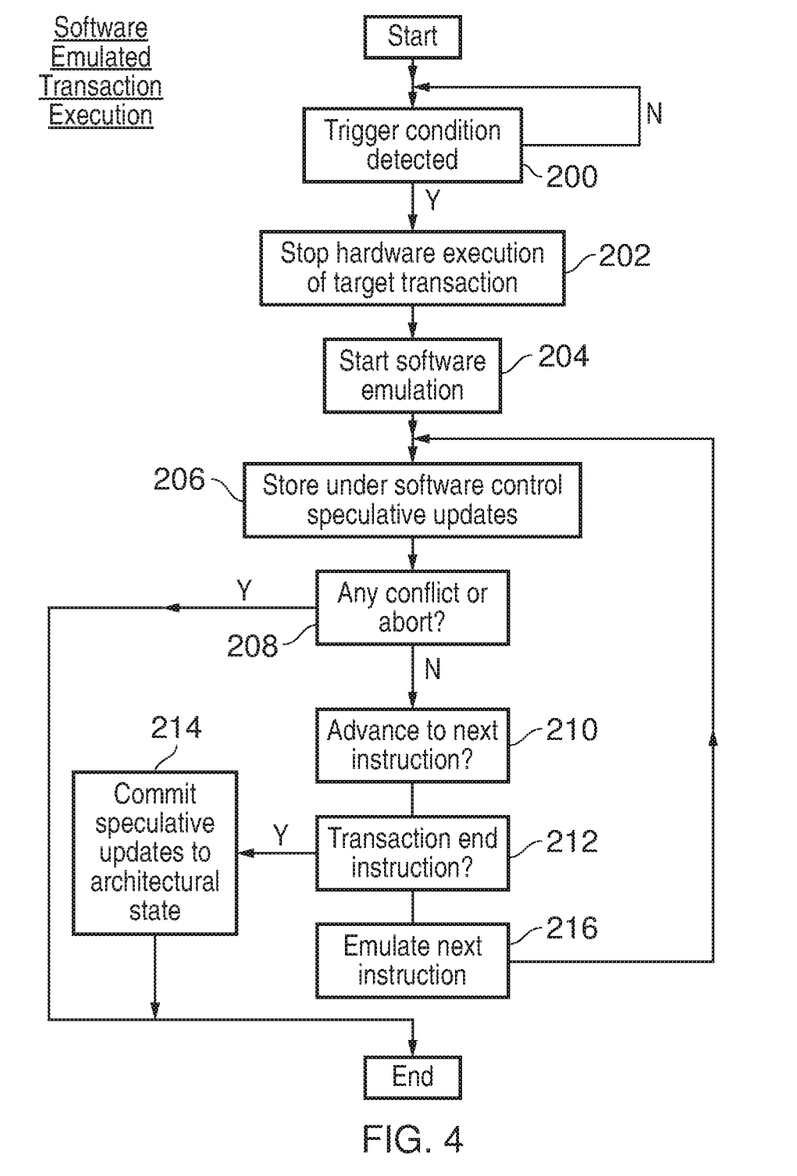
FIG. 4 is a flow diagram schematically illustrating software emulated transaction execution.

FIG. 4 is a flow diagram schematically illustrating software emulated transaction execution. At step 200 processing waits until a trigger condition is detected by the debug and diagnostic circuitry 22. This triggered condition may take a variety of different forms. One example form would be the execution of a transaction start instruction associated with a particular transaction. One way this might be achieved would be to detect the execution of a transaction start instruction with a program counter value matching a predetermined program counter value and correspond to the start of a target transaction to be subject to diagnosis/debugging.

When the triggered condition is detected, step 202 serves to stop hardware execution of the target transaction. Step 204 starts software emulation of the target transaction. This software emulation may be instruction-by-instruction software emulation (i.e. single-stepping execution) facilitating single-stepping analysis of the behaviour of the target transaction.

Step 206 serves to store, under software control, the speculative updates to the state data associated with the target transaction for each emulated instruction. This provides stored versioning of the speculative updates to facilitate an understanding of the behaviour of the target transaction. Step 208 determines whether or not any conflict or abort has arisen for the target transaction being subject to software emulation. If such a conflict or abort arises, then the software emulated transaction execution is finished. If no conflict or abort is detected, then step 210 serves to advance the execution point to the next instruction to be emulated. Step 212 determines whether the next instruction is a transaction end instruction. If the next instruction is a transaction end instruction, then step 214 serves to commit the speculative updates to the architectural state of the system. If the determination at step 212 is that the next instruction is not a transaction end instruction, then step 216 serves to emulate that next instruction and processing returns to step 206.

Figure 5:
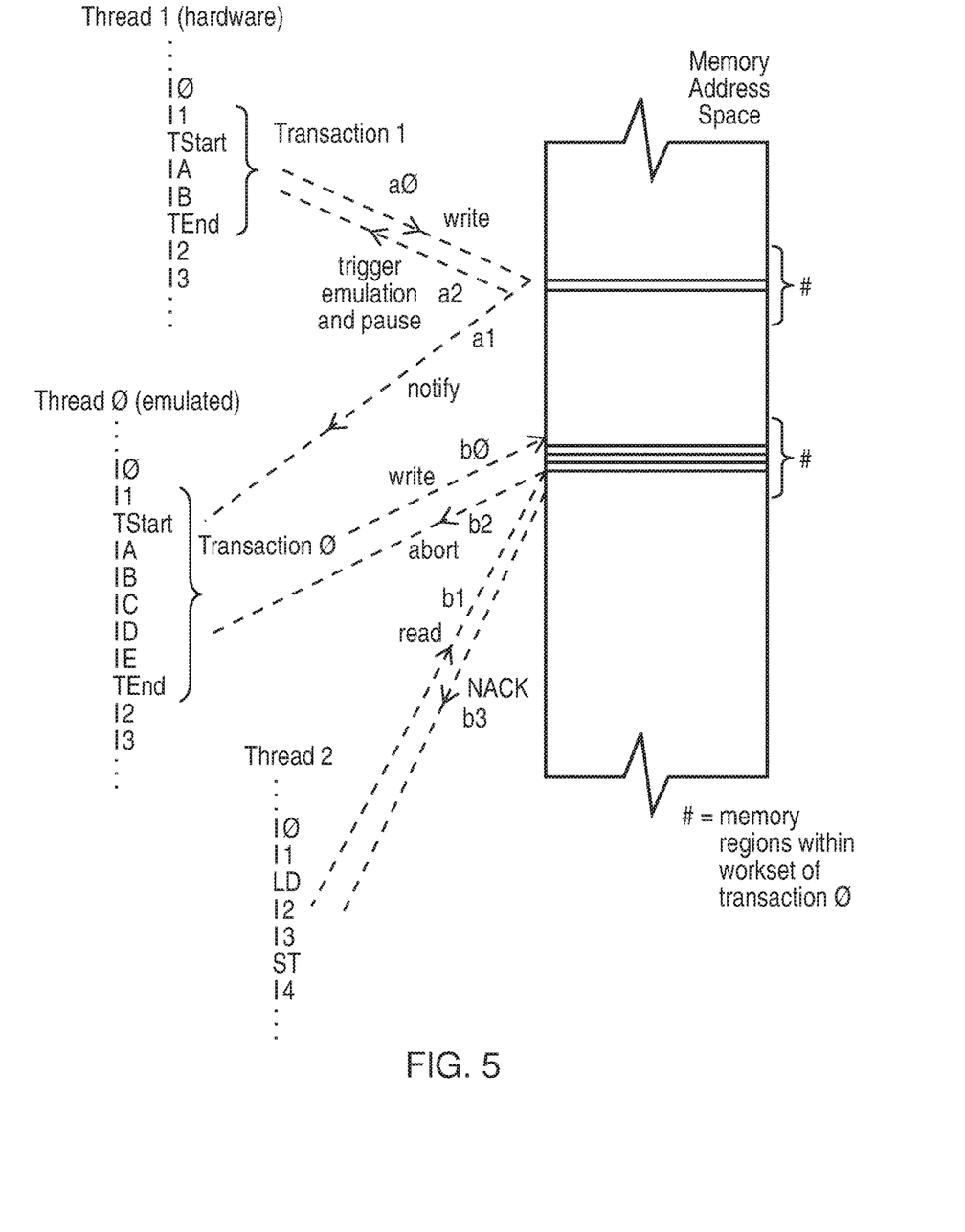
FIG. 5 is a diagram schematically illustrating types of conflict which can arise between transactions.

FIG. 5 schematically illustrates various forms of conflict which may arise between concurrently executing transactions. Thread 0 is subject to software emulation. The regions within the memory address space of the system which are part of a work set of data being used by Thread 0 are marked with "#" in FIG. 5.

In the case of Thread 1, this performs a write as action a0 to part of the work set of data for Thread 0. Conflict detecting hardware circuitry identifies this as a conflict. Such conflict detecting hardware circuitry may comprise, for example, snoop or data coherency mechanisms provided to support shared memory operation (and programmed/configured as part of the setup of the software emulation). The detected conflict serves to trigger a notify signal being sent to Thread 0 as action a1 so that the emulation of Thread 0 is made aware of the conflict. Furthermore, a signal triggering Thread 1 to commence software emulation of Thread 1 and to pause is sent at step a2.

A further example of a conflict that can arise is illustrated in relation to Thread 0 and Thread 2. In this case, Thread 0 performs a write to a memory address within its work set of data as step b0. Subsequently Thread 2 performs a read to this memory address (or at least to the same region of memory corresponding to the granularity at which memory accessed are being tracked). This read operation is indicated as b1 in FIG. 5. The conflicting read triggers the software emulated Thread 0 to be aborted via action b2 and the return of a non-standard response signal NACK as action b3. The non-standard response signal is sent to Thread 2 which was the request source for the read request sent as b1.

Figure 6:
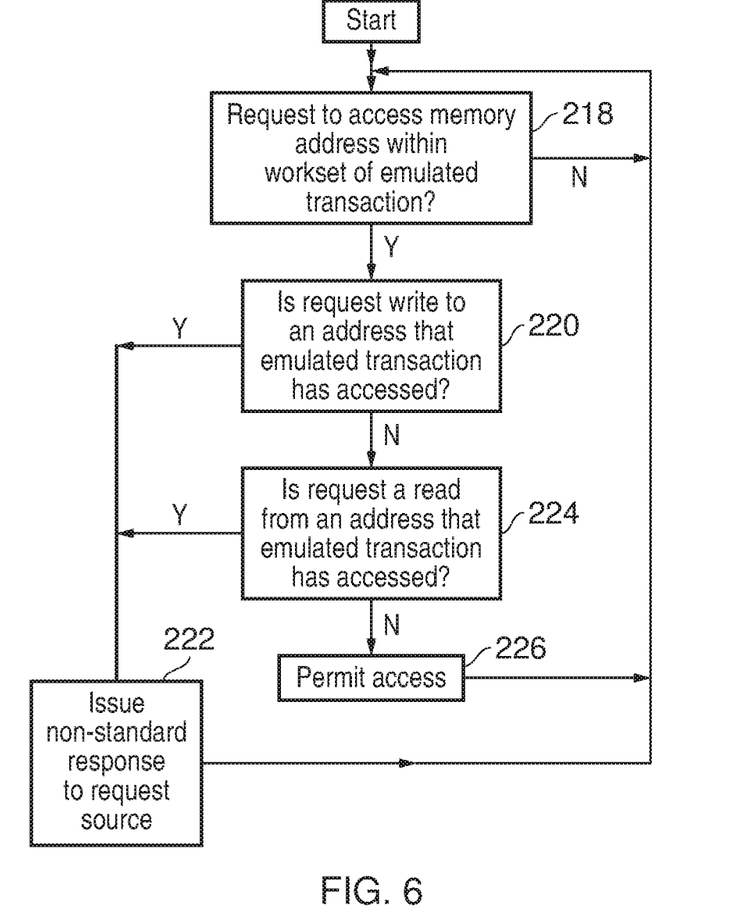
FIG. 6 is a flow diagram schematically illustrating the issue of a non-standard response to a request source.

FIG. 6 is a flow diagram schematically illustrating the detection of conflicts between a transaction having a work set of data and other processing within the system. At step 218, a request to access a memory address within a work set of the data for the emulated transaction is detected. Step 220 determines whether the request is a write to an address that the emulated transaction has accessed. If the request is a write, then step 222 issues a non-standard response request to the source in the form of, for example, an NACK signal as shown in FIG. 5. Step 222 determines whether the request is a read address that the emulated transaction has accessed. If the request is a read, then again a non-standard response signal may be issued. If neither the determination at step 220 or step 224 is positive, then step 226 serves to permit the access to be performed.

Figure 7:
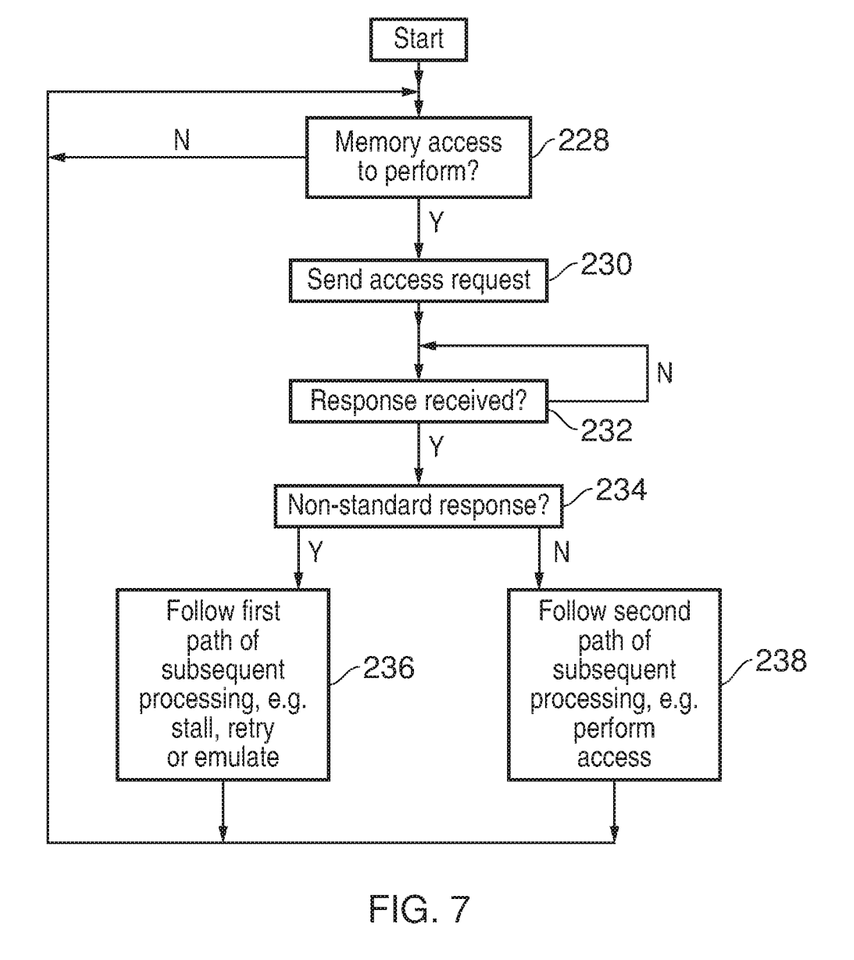
FIG. 7 is a flow diagram schematically illustrating control of subsequent processing in response to receipt of a non-standard response.

FIG. 7 schematically illustrates the behaviour at a request source in response to receipt of a non-standard response. At step 228, processing waits until there is a memory access to perform. Step 230 sends the memory access request to the request destination. Step 232 waits until a response is received from the request destination. Step 234 determines whether the response received is a non-standard response. If the received response is a non-standard response, then step 236 serves to trigger the request source to follow a first path of subsequent processing, such as, for example, stalling, retrying the request, or software emulation of processing at the request source. If the response returned is not a non-standard response, then step 238 serves to control the request source to follow a second path of subsequent processing, such as performing the access which was requested at step 228. It will be appreciated that both the first path of subsequent processing and the second path of subsequent processing serve to update the architectural state of the system and are both legitimate paths for forward progress to be made in the processing performed.

Figure 8:
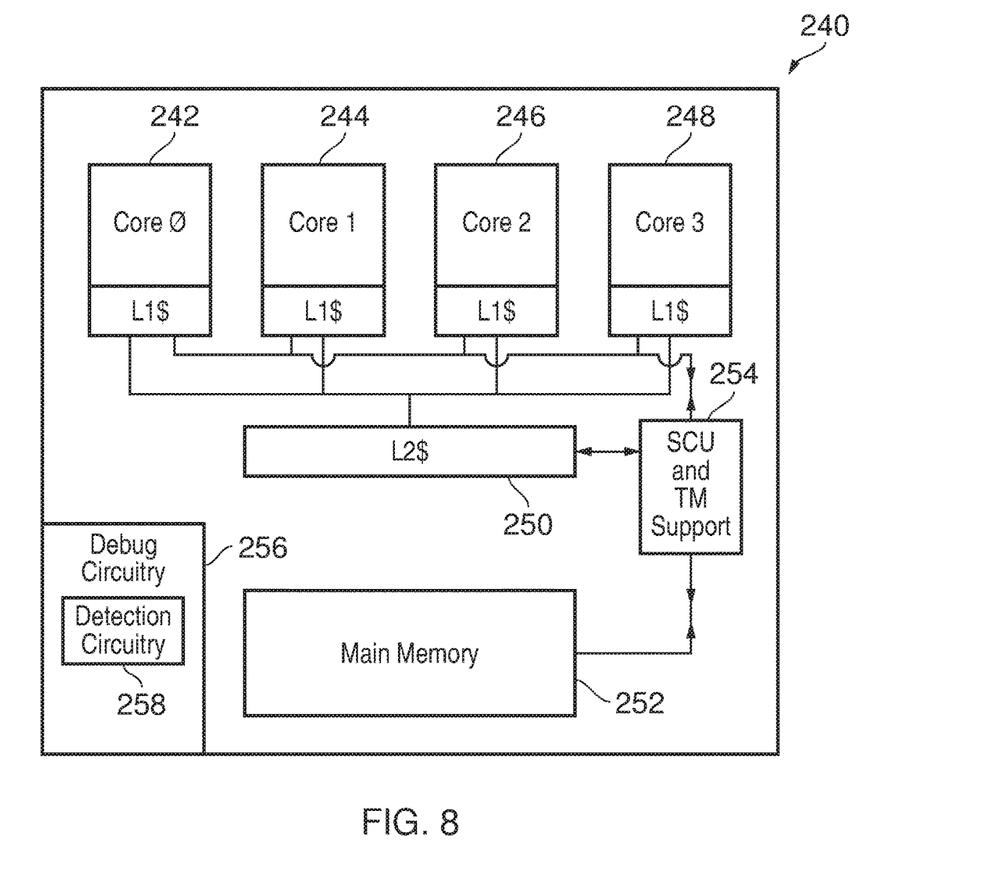
FIG. 8 is a diagram schematically illustrating a data processing apparatus comprising multiple processor cores.

FIG. 8 schematically illustrates a data processing apparatus 240 comprising a plurality of processor cores 242, 244, 246 and 248 each having a local cache memory. A shared cache memory 250 as well as a main memory 252 are also provided within the hierarchical memory system of the data processing apparatus 240. A snoop control unit and transaction memory support circuitry 254 is provided and is coupled to the memory system at various points. The snoop control unit and transactional support circuitry 254 serves to ensure data coherence for different threads of processing using the shared memory system as well as serving to detect conflicts arising between a partially completed transaction with its associated speculative updates to state data and other memory accesses within the system. If such a conflict is detected, then the transaction concerned may be aborted and the speculative updates discarded.

Also illustrated in FIG. 8 is debug circuitry 256 which serves to support debug and diagnostic operations of the data processing apparatus 240. The debug circuitry 256 includes detection circuitry 258 which detects trigger conditions for triggering the initiation of diagnostic or debug operations, such as software emulations of transactions, stalling or retrying of transactions and the like. The detection circuitry may detect trigger conditions of a variety of different forms including, for example, execution of a trigger program instruction, execution of a program instruction having an associated program counter value matching a predetermined program counter and/or detecting access to a predetermined memory address or memory address region.

Figure 9:
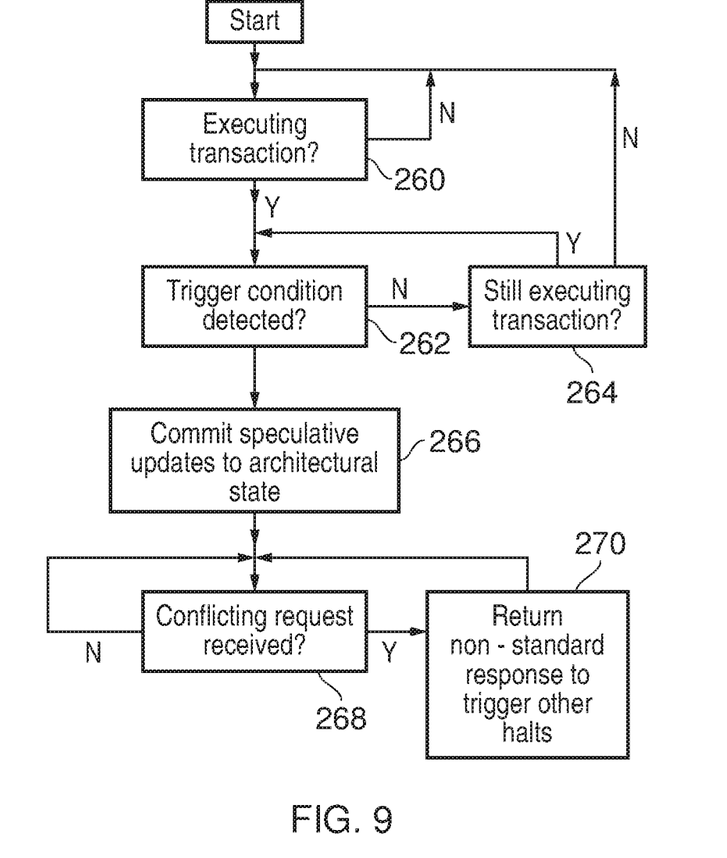
FIG. 9 is a flow diagram schematically illustrating stopping execution of a transaction saving speculative updates when a triggered condition is detected.

FIG. 9 is a flow diagram schematically illustrating further example behaviour which may be provided in some embodiments in understanding transactions. Processing waits at step 260 until execution of a transaction is detected. Step 262 then determines whether or not a trigger condition associated with "freezing" execution of that transaction has occurred. If such a trigger condition has not arisen, then step 264 determines whether or not the transaction is still executing and if so returns processing to step 262. If the transaction terminates without the trigger condition being detected, then processing returns to step 260.

If the triggered condition is detected at step 262, then step 266 serves to commit the speculative updates being held for the transaction being executed to architectural state of the system. This goes against the normal behaviour of transactions in which the architectural state of the system is normally only updated if the whole of the transaction completes without a conflict being detected. However, saving the speculative updates partway through the execution of a transaction may provide useful information in understanding the behaviour of the transaction.

Processing then proceeds to step 268 where a determination is made as to whether any conflicting request to the transaction which has been halted is made. If any such conflicting request is received, then step 270 serves to return a non-response signal to the request source for the conflicting request. This non-standard response signal can serve to trigger the request source to itself stop its execution and save its state, e.g. if the request source is another transaction, then that other transaction may have its operation halted and its state saved partway through its execution.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. A method of processing data comprising:
    executing program instructions including a target transaction having one or more program instructions that execute to generate speculative updates to state data and to commit said speculative updates if said target transaction completes without a conflict;
    detecting a trigger condition corresponding to direct execution by processing hardware of a program instruction of said target transaction;
    upon detecting said trigger condition, initiating software emulation of execution of said target transaction, said software emulation operating:
        to store data representing one or more versions of said speculative updates generated during emulation of execution of said target transaction; and
        to detect a conflict with said target transaction.

2. A method as claimed in claim 1, wherein said target transaction has a plurality of program instructions that execute to generate speculative updates to state data and to commit said speculative updates if said target transaction completes without a conflict.

3. A method as claimed in claim 1, wherein said conflict comprises an access to a memory address in use by said target transaction.

4. A method as claimed in claim 3, wherein said access comprises one of:
    a write to a memory address that has been accessed by said target transaction; and
    a read from a memory address that has been accessed by said target transaction.

5. A method as claimed in claim 1, wherein said software emulation single steps execution of said target transaction to permit said software emulation to be stopped after emulation of execution of individual instructions of said target transaction.

6. A method as claimed in claim 1, wherein said program instructions include a plurality of target transactions and said software emulation operates to emulate a plurality of concurrently executing target transactions and to detect conflict between said plurality of concurrently executing target transactions.

7. A method as claimed in claim 6, wherein said software emulation operates to control relative rates of emulated execution of said plurality of concurrently executing target transactions.

8. A method as claimed in claim 1, wherein a start of said target transaction is marked with a transaction start instruction and said trigger condition is execution of said transaction start instruction.

9. A method as claimed in claim 1, comprising
    upon detection of a request from a request source to perform a memory access conflicting with said target transaction undergoing software emulation, issuing a non-standard response to said request source.

10. A method as claimed in claim 9, comprising
    upon receipt of said non-standard response at said request source, one of:
        stalling execution at said request source;
        retrying said request; and
        initiating software emulation of execution at said request source.

11. A method as claimed in claim 10, comprising controlling a relative rate of software emulated execution at said request source and said software emulation of said target transaction.

12. A method as claimed in claim 1, wherein said software emulation models availability of resources for storing said speculative updates to state data.

13. A method as claimed in claim 1, wherein conflict detecting hardware circuitry operates to detect said conflict during direct execution of said target transaction by said processing hardware and said software emulation reuses said conflict detecting hardware circuitry to detect said conflict during emulation of execution of said target transaction.

14. A method as claimed in claim 13, wherein said software emulation configures said conflict detecting hardware circuitry to detect said conflict during emulation of execution of said target transaction.

15. Apparatus for processing data comprising
    processing hardware directly to execute program instructions including a target transaction comprising one or more program instructions that execute to generate speculative updates to state data and to commit said speculative updates if said transaction completes without a conflict;
    detection circuitry to detect a trigger condition corresponding to direct execution by said processing hardware of a program instruction of said target transaction;
    emulation circuitry to perform, upon detecting said trigger condition, software emulation of execution of said target transaction, said software emulation operating:
        to store data representing one or more versions of said speculative updates generated during emulation of execution of said target transactions; and
        to detect a conflict with said target transaction.

* * * * *